Dec. 17, 1929.    R. P. DEWEY    1,739,667
MILLING CUTTER
Filed Oct. 31, 1925
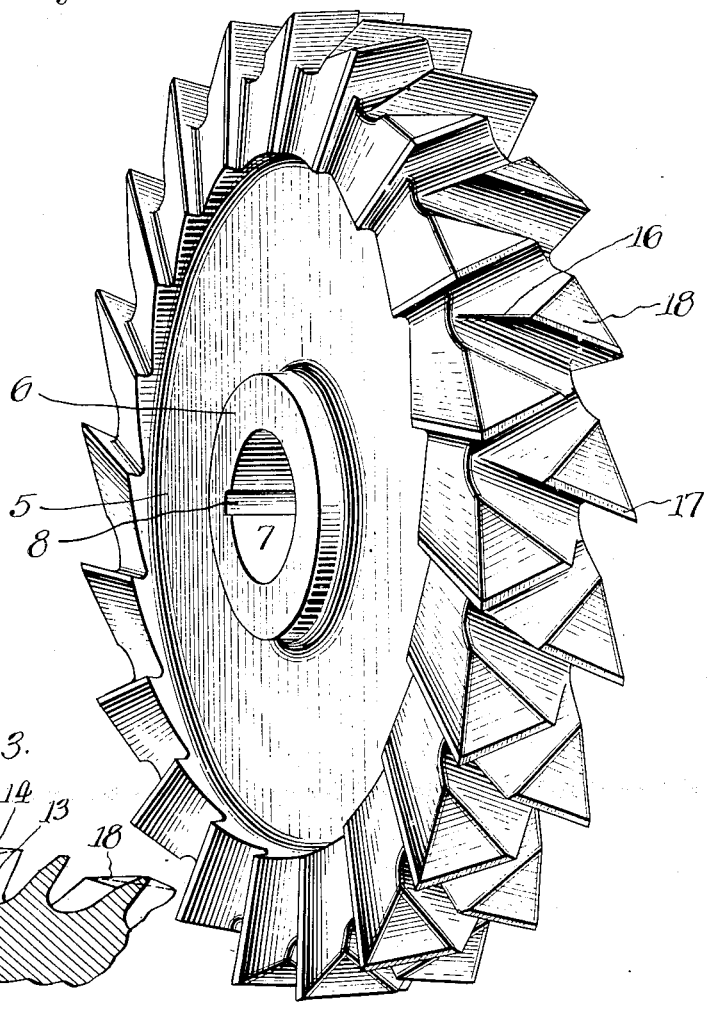
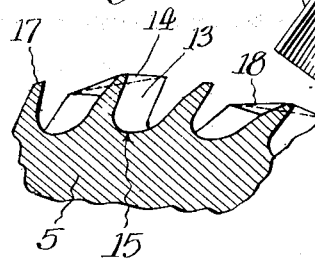
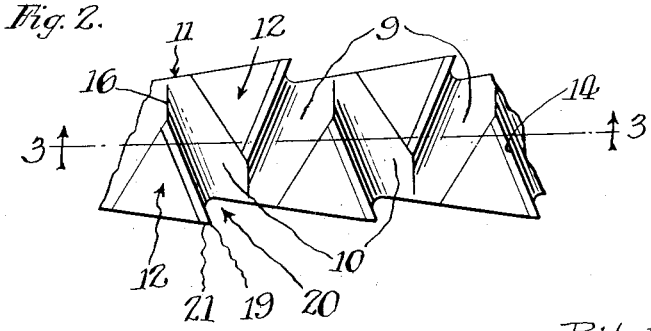
Inventor:
Ritchie P. Dewey,
By Lindahl, Parker & Carlson
Attys Patented Dec. 17, 1929

1,739,667

UNITED STATES PATENT OFFICE

RITCHIE P. DEWEY, OF ROCKFORD, ILLINOIS, ASSIGNOR TO BARBER-COLMAN COMPANY, OF ROCKFORD, ILLINOIS, A CORPORATION OF ILLINOIS

MILLING CUTTER

Application filed October 31, 1925. Serial No. 65,962.

This invention relates to milling cutters of the integral type as distinguished from cutters of the inserted tooth type.

The primary object of the invention is to produce a spirally gashed cutter having a maximum number of teeth in the periphery because of a staggered relation of intermeshing angularly disposed teeth, a large number of teeth being desirable to increase the efficiency of the cutter and to insure that the cutter operates to impart a smooth finish to the work, and to insure a great productive capacity and a long life for the tool.

Another object is to provide a cutter which can be readily milled from a blank to form a unitary integral cutter.

A still further object is to provide a rounded spiral clearance gash across the periphery of the cutter in one direction which intercepts the faces of the cutter at points which are common to another set of similarly spiralled gashes extending in the other direction, whereby to form by the rounded gashes a substantial support for the body of each tooth.

In the drawings there is shown an exemplary embodiment of the invention in which not only the periphery of the cutter but also the side faces of the cutter have cutting edges.

In the drawings, Figure 1 shows a perspective view of a cutter embodying the invention.

Fig. 2 is a portion of a rectified elevation of the periphery of the cutter.

Fig. 3 is a partial cross section on the line 3—3 of Fig. 2 showing the contour of the gash.

It is to be understood that the invention is not limited to the form disclosed and also that certain changes and modifications may be made in the arrangement of the parts of the cutter without in any way departing from the spirit and scope of the invention, as expressed in the appended claims.

In the drawings there is shown a cutter in the form of a disk suitable for cutting grooves or channels, there being teeth on the side faces as well as on the periphery of the cutter. The cutter has in the present instance a web body 5 and a hub portion 6 in which there is formed a mounting bore 7 provided with a keyway 8.

The periphery of the cutter in the present instance has two sets of teeth which are formed so that they are staggered about the periphery and so that they overlap and intermesh in order to provide a maximum number of teeth. The teeth are formed and defined by gashes cut in the milling body and the form and arrangement of the teeth are therefore dependent upon the form and arrangement of the gashes. In the present instance a rounded gash is used to form a tapering tooth body, and the ratio of the width of the gashes to the space between parallel adjacent gashes is less than unity to cause overlapping of the teeth. Two sets of gashes are provided in all respects similar but merely reversed in direction. It is also desirable that the two sets have a definite arrangement with respect to each other and for this purpose the intersections of the gashes of the two sets are made to fall at the side faces of the cutter.

In the cutter of the drawings two sets of gashes are represented by the numerals 9 and 10, the gashes intersecting at 11 in the plane of the side faces of the cutter. Thus, any two gashes 9 and 10 define a tooth 12 therebetween which has an annular cutting face 13 and a cutting edge 14 spiral in form. Each gash is made rounded so that round valleys 15 are formed, in this manner imparting to each tooth a firm integral relation with the mill body of such a character that each tooth tapers outwardly therefrom. Thus the angular intersection of the rounded valleys 15 forms a slanting edge 16 for each tooth which gives a laterally tapered form to the tooth in addition to its tapering form between the front and rear gashes. Thus the tooth is provided in all directions with a sufficient material to give it a firm support from the body portion of the cutter.

After formation of the teeth by cutting the gashes, the body of each tooth is suitably modified in order to produce an efficient cutting body. The top is relieved as shown at 17 and the rear of the tooth is removed slantingly as shown at 18 to provide for chip clearance.

The teeth are formed in intermeshing relation so that they will overlap in their cutting range, each tooth extending from one face beyond the middle of the peripheral face. This is accomplished by providing gashes, the width of which on the periphery of the cutter is less than the space between adjacent parallel gashes. Only a slight initial overlapping of the teeth is required, because as the teeth are later sharpened by grinding away the edge 14 at the face 17, the teeth are shortened radially and become wider because of the sloping edge 16. Thus the overlapping of the teeth increases as the cutter is used.

In the present instance the teeth so formed are triangular in shape and lie adjacent the side faces of the cutter. When desired, side cutting edges 19 may be formed by cutting back each tooth as shown at 20 and by forming a cutting relief 21.

The cutter which has been above described is of simple construction adapted for economic manufacture as an integral cutter. In making such a cutter, a blank is milled with one set of spiral gashes all the way around. The work blank is then reset in the machine and the opposite spiral gashes are cut. In cutting the second set, the cutting tool passes through portions of the blank already cut in the first operation, these portions being common to the two sets of spiral gashes, or, in other words, common to two converging gashes. The tool is thus generally formed by two milling operations after which it is only necessary that the tops of the teeth be completed and the teeth on the side face formed when desired.

I claim as my invention:

1. An integral disk cutter comprising, in combination, a cutter body, and a plurality of cutting teeth on the periphery of said body, said teeth being arranged in two sets at opposite side faces of the body, with the teeth of one set staggered with respect to the teeth of the other set about the periphery, and with the teeth of the two sets overlapping in their cutting range, the teeth of each set being peripherally alined, each tooth having a cutting edge which is substantially spiral in form, the forward portion of one tooth being laterally adjacent the rear portion of the next forward tooth, each tooth being formed between similar spiral gashes having opposite directions, and each set of tooth-forming gashes intersecting at a side-face of the cutter.

2. An integral disk cutter comprising, in combination, a disk body, and a plurality of teeth about the periphery of said disk body, said teeth comprising two sets with the teeth in one set arranged in staggered relation to the teeth in the other set, each set having teeth extending from one side-face of the cutter to a point beyond the center of the peripheral face of the cutter, the cutting edge of each tooth being substantially spiral in form whereby the front portion of one tooth and the rear portion of the advance tooth of the other set are laterally adjacent on the peripheral face, there being formed spiral gashes at the front and rear of each tooth, said gashes being similar in form but reverse in direction, and said gashes intersecting at a common point in the side-face of the disk.

3. An integral cutter comprising, in combination, a body, said body being formed in its periphery with longitudinally inclined gashes, alternate gashes being inclined in opposite directions and intersecting in the side faces of said body so as to form a zigzag space about said body, the inner ends of said gashes being rounded so as to form a slanting edge at each intersection, said gashes defining two sets of similar triangularly shaped teeth at opposite side faces of said body with the inner pointed ends of the teeth in staggered and overlapping relation.

In testimony whereof, I have hereunto affixed my signature.

RITCHIE P. DEWEY.